(No Model.)
2 Sheets—Sheet 1.
J. T. OVERTON.
PLOW.
No. 280,230.
Patented June 26, 1883.
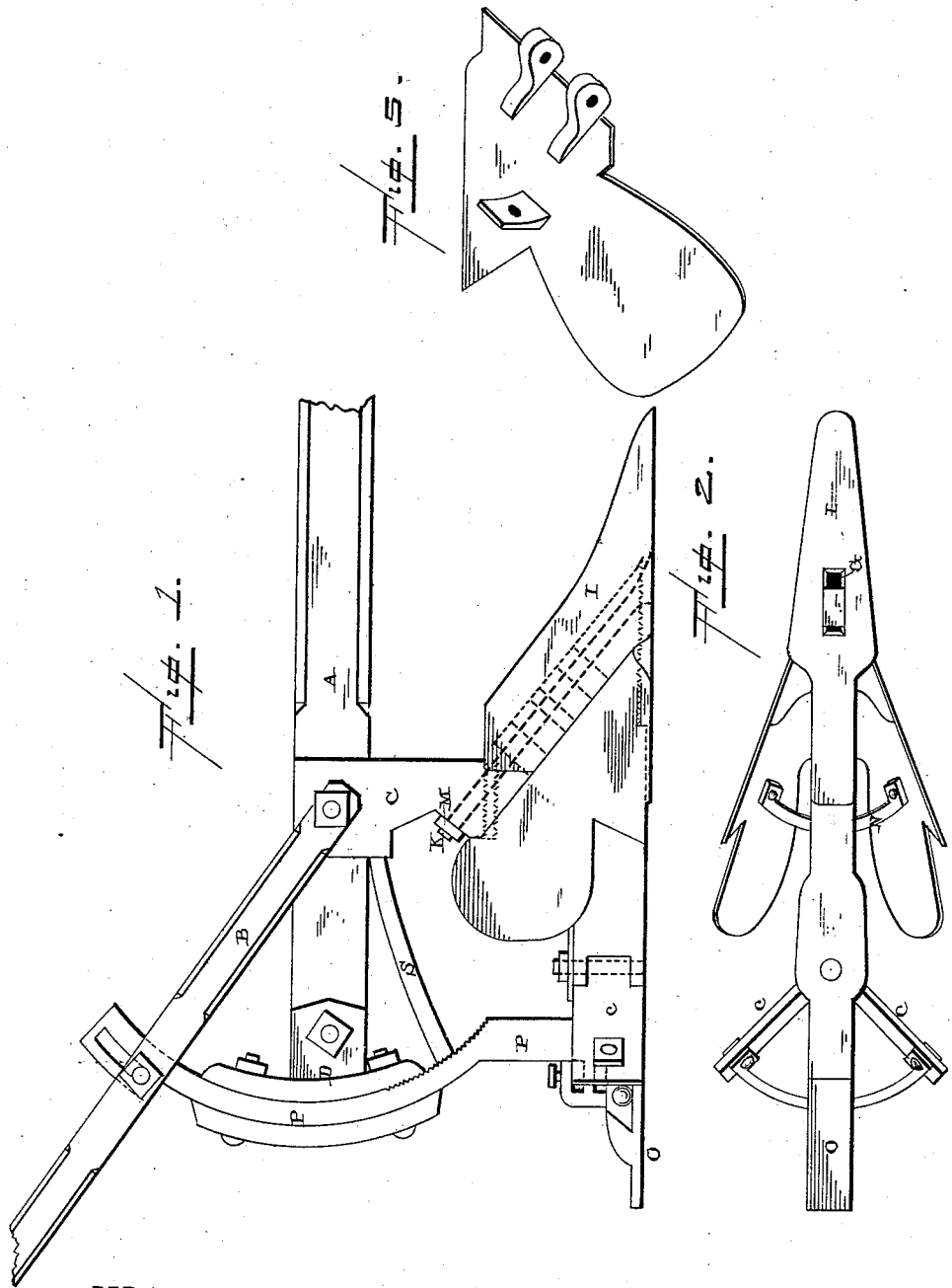
Witnesses.
Louis F. Gardner
J. W. Garner
Inventor.
J. T. Overton,
per
F. A. Lehmann,
Atty

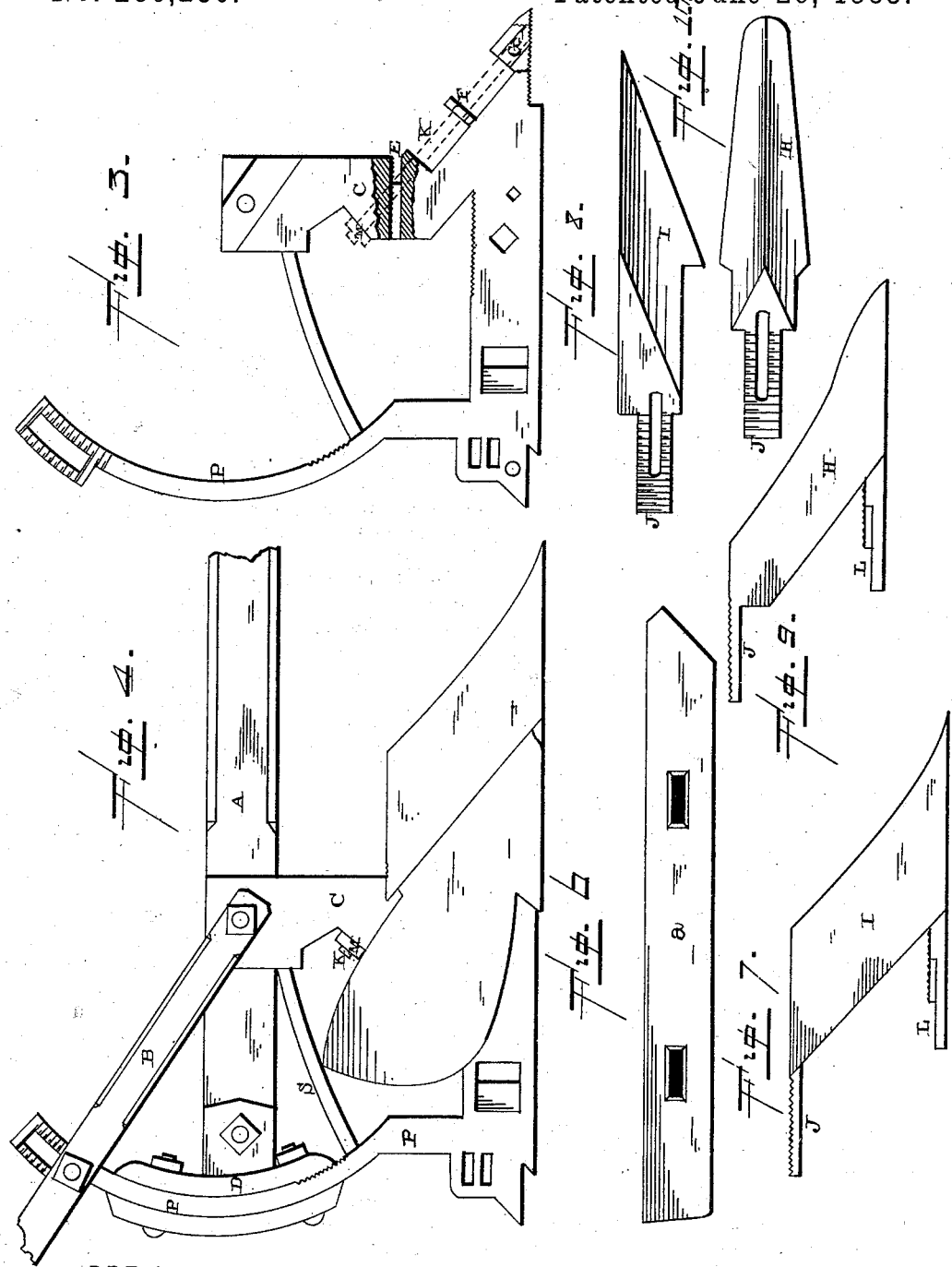

UNITED STATES PATENT OFFICE.

JAMES T. OVERTON, OF WINTON, NORTH CAROLINA.

PLOW.

SPECIFICATION forming part of Letters Patent No. 280,230, dated June 26, 1883.

Application filed January 4, 1883. (No model.)

*To all whom it may concern:*

Be it known that I, JAMES T. OVERTON, of Winton, in the county of Hertford and State of North Carolina, have invented certain new and useful Improvements in Plows; and I do hereby declare the following to be a full, clear, and exact description of the invention, such as will enable others skilled in the art to which it pertains to make and use it, reference being had to the accompanying drawings, which form part of this specification.

My invention relates to an improvement in plows; and it consists in the arrangement and combination of parts, that will be more fully described hereinafter, whereby the plow is adapted to perform all of the various kinds of work required by a farmer in the cultivation of his crops.

Figures 1 and 4 are side elevations of my invention, used separately as a cultivator and a plow. Fig. 2 is an inverted view. Fig. 3 is a detached view of the stock alone. Figs. 5, 6, 7, 8, 9, 10 are detail views.

A represents the beam; B, the handles, and C the stock. The beam is of ordinary construction, and has the casting D bolted to its rear end, for the purpose of adjusting the end of the beam up and down as it is required to plow shallow or deep. The handles are bolted at their lower ends in suitable recesses formed to receive them in the sides and the upper end of the stock, and are also bolted to the upper slotted end of the stock, so that they can be raised and lowered in the usual manner. The stock C has a suitable opening or recess in its top, so as to straddle over the under side of the beam, and has, at any suitable distance below its top, the horizontal opening E, made through it, for the slotted projection upon either the point or the front portion of the plowshare to pass through. The under side of this opening is made serrated, so as to engage with corresponding serrations on the slotted extensions, and so be adapted to hold the share or point in any desired position. Upon the front portion of this standard is formed a suitable eye or projection, F, which forms a portion of the hinge upon which the wings are to swing or move, and through the lower front portion of the standard is made a corresponding hole, G. The hole which is formed through the point G and the hinged part F extends on diagonally up through the standard, so as to intersect the opening E.

Upon both the point H and the front part of the share I are formed the slotted extensions J, which project from their rear upper corners, and the slotted extensions L, which project from their rear lower corners. Through both of these extensions J L, and through the parts G F, and through the standard, is passed the bolt K, which receives a nut upon its upper end at M. This bolt may serve to hold the point rigidly in position, while at the same time it serves as a pivotal bolt on which the wings swing, or as simply the bolt to which the mold-board is secured at its front edge. The lower front edge of the standard is cut away, as shown, so as to fit upon the extensions L, on both the point and the share, and this edge is serrated, as shown, so as to engage with corresponding serrations upon the top of the extensions L, for the purpose of adjusting the point or the share into any desired position and holding it there. For the purpose of allowing the point or share to be adjusted back and forth, a slot is made through the extensions L, so that when the bolt K is loosened the share or point can be adjusted back and forth. For the purpose of allowing the earth to move freely back past the standard, the front edge of the standard is made sharp, so that the earth will not catch against it and choke the plow. When plowing is to be done, the share is applied to the front of the standard, as shown, and the mold-board is attached at its front edge to the bolt K, and is then braced into position, by means of a suitable arm, N, against the foot of the plow. As the arm can be adjusted, and as the mold-board can be turned freely upon its pivotal point, any desired inclination can be given to the mold-board. While the plow is being used for plowing, the landside *a* is applied in its proper place upon the foot, and held in place by suitable bolts, which pass through the landside and the foot. Suitable slots are made in the landside, and the slots may be serrated or not, so that the bolts will hold it in any position into which it may be adjusted. While the mold-board is in position the heel O is removed from the rear end of the foot.

When the implement is to be used for throwing the dirt toward the growing plants, the share is removed, and the point H is put in its place. A suitable wing is then pivoted from both sides of the standard upon the bolt K, and turned outward at any desired angle. These wings will be provided with suitable curved arms, which are serrated upon their under sides, and made to catch between the top of the foot and the serrated plate which is bolted thereto. These serrated arms allow the wings to be adjusted back and forth, so as to throw the dirt to a greater or less distance, as may be desired. Through the foot of the plow, just in advance of the point from which the handle-support P rises, is made a suitable opening, and in this opening are pivoted a second small set of wings, c, which can be adjusted laterally by means of curved arms, in the manner described. These wings may be made to operate in connection with the front wings for the purpose of moving the dirt toward the plants, or the wings may be used by themselves for this purpose. While the wings are being used for the purpose of moving the dirt toward the plants, the heel O is attached to the rear end of the foot for the purpose of forming a support for the implement. The handle-support P is curved, as shown, and has its central portion serrated, so as to be adapted to fit against corresponding serrations made on the rear side of the casting which is secured to the beam. Applied to the rear side of this handle-support is a suitable curved casting, and the clamping-bolts which secure the casting on the beam and the support together then pass through the casting, the support, and the casting which is applied to the rear side of the support. Suitable slots or elongated holes are made through the support, so that the beam can be adjusted up and down at will, without having to do anything more than to loosen the clamping-bolts. The support P and the standard are braced rigidly together by the brace S.

By means of the construction above described it will be seen that the plow is adapted, by the change of parts, to perform ordinary plowing, and then the cultivation of the crops. Should any of the parts become broken or lost, they can readily be replaced by others. As the one implement, with its attachments, will cost much less than the different implements that are required upon a farm, farmers will be saved a great expense in their outlay.

Having thus described my invention, I claim—

1. The standard having the opening E and the eye F, with a point or share provided with the extensions J L, and the pivotal bolt K, substantially as shown.

2. The combination of the standard, the pivotal bolt K, a point or share having the extension J L, and the wings which are applied to the bolt and braced in position by means of the arms, substantially as described.

3. A plow provided with a large set of pivoted wings arranged just in the rear of the point, and a smaller set of pivoted wings applied to the foot near its rear end, both sets of wings being adapted to move the dirt toward the plants, substantially as shown.

In testimony whereof I affix my signature in presence of two witnesses.

JAMES THOMAS OVERTON.

Witnesses:
S. P. TAYLOR,
J. G. JOYNER.